United States Patent [19]

Fontein et al.

[11] 4,189,384
[45] Feb. 19, 1980

[54] GAS TREATMENT OF LIQUID

[75] Inventors: Freerk J. Fontein, Heerlen; Hubertus F. Jennekens, Geleen, both of Netherlands

[73] Assignee: Stamicarbon, B.V., Geleen, Netherlands

[21] Appl. No.: 571,352

[22] Filed: Apr. 24, 1975

[30] Foreign Application Priority Data

Apr. 26, 1974 [NL] Netherlands ............... 7405628

[51] Int. Cl.$^2$ ................................................ C02B 1/34
[52] U.S. Cl. ............................... 210/60; 210/63 R; 210/14; 210/194; 261/123
[58] Field of Search .............. 210/14, 15, 220, 221 R, 210/63, 60, 195–197, 194; 261/123, 91, 119 R, 121, DIG. 75

[56] References Cited

U.S. PATENT DOCUMENTS

| | | | |
|---|---|---|---|
| 1,734,011 | 10/1929 | Harrison | 210/15 |
| 3,503,593 | 3/1970 | Nelson | 261/DIG. 75 |
| 3,733,263 | 3/1973 | Mandt | 210/14 |
| 3,840,216 | 10/1974 | Smith et al. | 210/14 |
| 3,846,292 | 11/1974 | Lecompte, Jr. | 210/14 |
| 3,925,522 | 12/1975 | Schreiber | 261/121 R |

FOREIGN PATENT DOCUMENTS 308254  3/1929  United Kingdom ............ 261/DIG. 75

*Primary Examiner*—Charles N. Hart
*Assistant Examiner*—Benoit Castel
*Attorney, Agent, or Firm*—Cushman, Darby & Cushman

[57] ABSTRACT

A method and apparatus for aerating a body of waste water in which air is supplied to a bell chamber disposed below the surface of the water and in which a stream of water is withdrawn from the body and jetted through the air space in the chamber so as to penetrate the water residing below the chamber and thereby drive air into the water.

5 Claims, 3 Drawing Figures

GAS TREATMENT OF LIQUID

This invention relates to a process and apparatus for gas-treatment of a body of liquid by subjecting the liquid to gas-treatment in a bell gas chamber placed below the surface of the body of liquid, the chamber being supplied with gas under pressure. The invention particularly contemplates aeration of waste water by this process and apparatus.

BACKGROUND OF THE INVENTION

It has been recognized that for a given contact surface area between a liquid and a gas the ability of the gas to dissolve in the liquid increases directly proportionally to the hydrostatic pressure. For this reason it is often desirable in waste water aeration installations to aerate the water below the water surface. It has long been known, for example, to introduce air at superatmospheric pressue through fine-pore distributing elements placed below the liquid surface. This technique requires considerable energy and is often unreliable.

It is also known that aeration can be accomplished by operating a stirrer in a bell under the water surface and feeding as much air to the bell as can be introduced into the water by the stirrer. The stirrer, which may be for example a rotating cylindrical brush or a rotatable surface aerator device agitates the water and the air. Examples of these types of aeration systems are disclosed in published German patent specifications Nos. 1800315 and 2216917. These systems suffer from the disadvantage that the flow of liquid circulating in the basin is not brought about by the aeration means and that excess air escapes from the bell in the form of coarse bubbles.

In co-assigned abandoned United States application Ser. No. 437477, file Jan. 28, 1974 there is described a device for aeration of waste water in a polygonal or rounded basin in which one or more water jets are supplied from above the water surface at a certain angle with the water surface and with the average directon of flow of the waste water. The results obtained in the industrial application of this process have proved effective. The energy cost of this process offers advantages compared with those of processes in which the aeration and suspension of active sludge are combined, but the energy cost still makes up a large portion of the total cost of waste water purification.

It is also known that waste water can be subjected to gas-treatment with the aid of one or more ejectors, in which air is aspirated and distributed in the water by means of a water jet. At the same time, the water in the basin can be kept in motion. The drawback of this is that high water velocities have to applied in order to introduce a sufficient amount of air. Owing to the high water velocity the sludge becomes degraded.

SUMMARY OF THE INVENTION

The purpose of the present invention is to achieve improved aeration of waste water in biological purification installations, to keep the water in the basin in motion, and not to damage substances that are present in the liquid.

In the process of the invention gas is supplied under pressure to a generally bell-shaped chamber disposed below the surface of a body of liquid to thereby form a gas space in the chamber, and a stream of liquid obtained from the body of liquid is introduced into the gas space in the form of at least one liquid jet which passes through the gas space and into the liquid residing below the gas space to thereby drive gas into the liquid. The amount of gas supplied to the gas chamber is about equal to the quantity of gas driven into the liquid by the liquid jet. The pressure at which the gas is supplied is mainly that which is necessary to overcome the hydrostatic pressure of the gas in the chamber. The apparatus for carrying out the process is not constructed as an ejector because this would bring the disadvantage that a high water velocity is invariably required to aspirate a sufficient amount of air. These high water velocities may under certain conditions damage the flora present in the liquid.

The chamber is effectively placed one to several meters below the water surface, for instance at a point which is located approximately at or below the middle of the water depth of the basin. The water jets may be formed with the aid of a horizontal feed tube provided with one or more outlet apertures which face downwards at a slant. The gas chamber may be formed between the feed and a downwardly concave plate sealed to the top of the feed tube above the apertures and extending outwardly and downwardly so that the free edge of the plate resides at about the level of the lower side of the tube and at the same time is clear of the jets. Gas is supplied to the chamber through one or more gas feed tubes passed through the plate.

It appears that the same or better gas-treatment can be achieved with the process and apparatus according to the invention at a lower or equivalent energy consumption than with other known devices, including the device described in the aforesaid application Ser. No. 437477. The gas to be dissolved in the water is dispersed in the body of the water along a long path outside the bell under elevated hydrostatic pressure. The total energy consumption is here understood to mean the energy consumption, in kWh per kg of oxygen introduced, required to shape the water jets, as well as to compress the gas to be introduced. Aeration with compressed air delivered through perforated lines arranged on the bottom of the basin is insufficiently reliable at a favorable energy efficiency. Surface aeration by means of, for instance, large rotating brushes and rotatable surface aerator devices is reliable, but gives an unfavorable energy efficiency and high investment and maintenance costs. The aeration process of the present invention combines, depending on the conditions, an energy efficiency improved by 25–50% improved reliability and very low cost of maintenance.

DETAILED DESCRIPTION

The invention will be further understood from the following description of an exemplary embodiment taken with the diagrammatical drawings in which.

Figure 1:
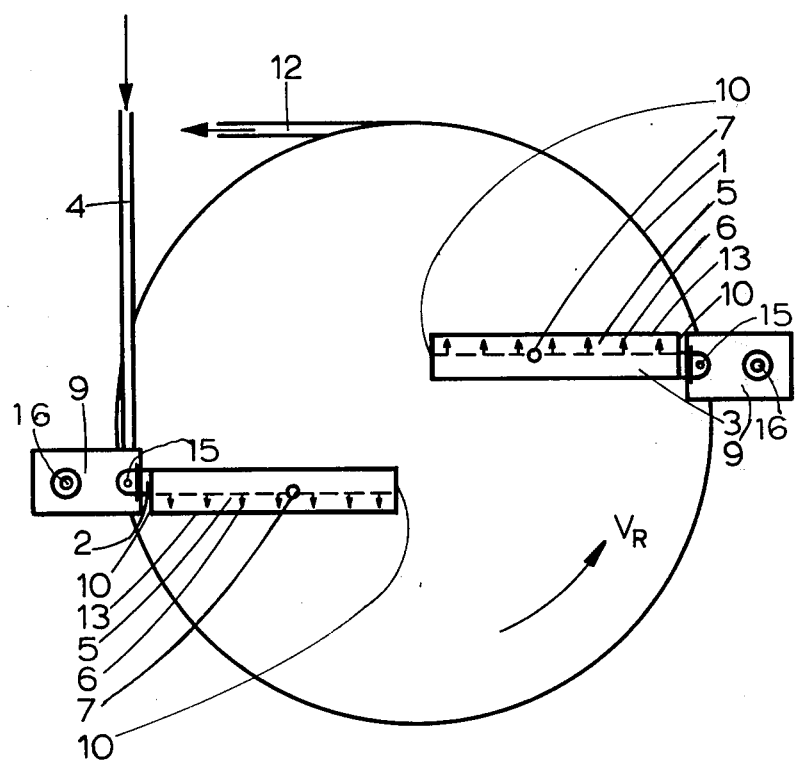
FIG. 1 is plan view of an apparatus embodying the principles of the invention.
Figure 2:
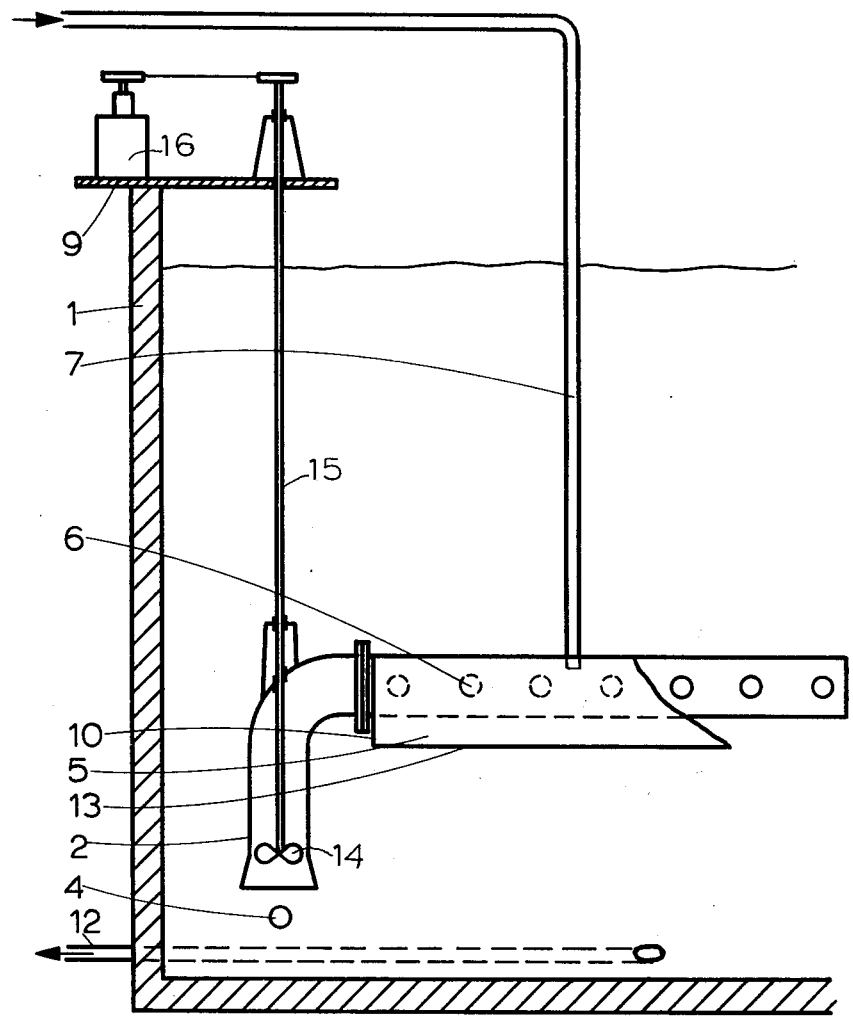
FIG. 2 is a vertical cross-section of a part of the apparatus.
Figure 3:
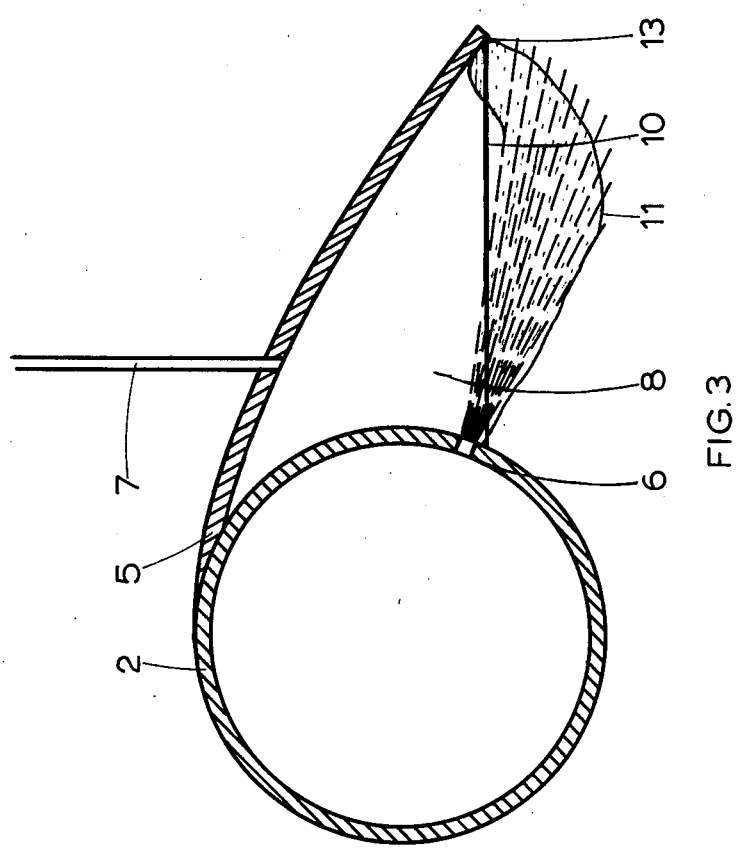
FIG. 3 is a vertical cross-section through a feed tube in a somewhat different embodiment.

FIG. 1 shows a round aeration basin 1 in which two horizontal water feed tubes 2 and 3 for recycling water are mounted opposite each other. Depending on the content of the basin, one or more tubes may be installed, preferably at an equal angular distance from each other. An inlet line 4 for the water to be purified terminates in the suction area of one of the feed tubes for recycling water. The main direction of liquid flow in the basin is indicated by $V_r$ and is circular about the axis of the basin 1. Each of the tubes 2 and 3 is provided with outlet apertures 6 which are spaced apart along the length of the tube. A plate 5 is sealed along one edge to the top of the tube and extends outwardly over the apertures 6 and then downwardly. Through line 7 a pressurized gas, for instance air, is led underneath the plate 5. For this purpose a compressor (not shown) is employed. Underneath the plate 5 a gas chamber 8 is formed, which is confined by the tubes 2 and/or 3, the edge of the plate 5, side baffles 10, and the liquid 11 in the basin.

Water from the body of water in the basin 1, including a major proportion of water entering the basin 1 through the inlet line 4, is pumped into the open lower end of the tube 2 by means of a pump assembly 9 suitably supported on or adjacent the basin 1. The pump assembly 9 includes an impeller 14 located in the open lower end of the tube 2, the impeller 14 being rotatably driven by a vertical shaft 15 which is driven by a motor 16.

The water pumped into the tubes 2 and 3 is sprayed from the apertures 6 in the form of jets which pass through a portion of the gas space and then into the liquid residing below the gas space. The apertures face laterally outwardly and downwardly with respect to the respective tube so that the jets strike the water surface at an angle and drive air from the gas space into the water. The horizontal component of the direction of movement of the jets is tangential the direction $V_r$ of recirculating movement of the liquid at the locaton of each jet, as seen in FIG. 1.

The discharge line 12 is connected to the basin tangentially to the main direction of flow $V_r$. The feed tubes 2 and 3 are supported by any suitable means (not shown).

The above-described process and apparatus exhibit low frictional losses, excellent mixing of gas and liquid, and a long residence time of the small gas bubbles in the liquid, which results in a low energy consumption per kg of gas introduced. The basin preferably has such a shape that a symmetric flow pattern is obtained and it may, therefore, have a horizontal section in the form of a circle, a regular polygon, an ellipse or a ring.

The process and apparatus can be used successfully to conduct an anaerobic purification phase after an aerobic purification phase. In this case the sludge is kept in suspension in the basin by the water jets, with stoppage of the air supply. If so desired, the issuing speed of the water jets may be reduced.

The invention is not limited to the details of the examples or the details of the drawings inasmuch as modifications of these features may be made within the scope of the claims.

What is claimed is:

1. A process for dissolving a gas such as air in a body of liquid such as waste water contained in a basin comprising supplying the gas under pressure to a generally bell-shaped gas chamber placed below the surface of the liquid to thereby form a gas space in the chamber said gas space overlying a portion of the body of liquid, introducing a liquid stream in the form of at least one liquid jet into the gas space so that the jet passes through at least a portion of the gas space and strikes the liquid residing below the gas space thereby driving gas from the space into the liquid, the quantity of gas supplied to the chamber being equal to the quantity of gas driven into the liquid by the liquid jet.

2. A process as in claim 1 including continuously circulating the body of liquid in a circular path about a vertical axis, wherein the water jet is directed in such a direction that it has a horizontal component of movement which at the location of the jet is tangential to the circulation path of the water, and wherein said liquid stream is obtained from the body of liquid in the basin.

3. Apparatus for dissolving a gas in a body of liquid comprising a generally bell-shaped structure disposed below the surface of the body of liquid, means for supplying gas under pressure to the interior of said structure so as to form a gas space therein disposed above a liquid surface, and means for supplying a stream of liquid to the interior of said structure in the form of a liquid jet which passes through at least a portion of the gas space and penetrates the liquid residing below the gas space at an angle to the surface of said liquid thereby driving gas from the gas space into the liquid.

4. Apparatus as in claim 3 wherein the means for supplying a stream of liquid includes a generally horizontal tube provided with a plurality of apertures spaced along the length of the tube on one side thereof and wherein said bell-shaped structure includes a plate coextensive with the tube and sealed to the tube above the location of the apertures and extending outwardly and downwardly to about the level of lower side of the tube.

5. Apparatus as in claim 4 wherein one end of said tube faces downwardly in the body of liquid and is fitted with an impeller which draws liquid from the body of liquid into the tube.

* * * * *